May 12, 1964 H. F. SHEPHERD, JR 3,133,235

VARIABLE IMPEDANCE

Filed Jan. 11, 1960 2 Sheets-Sheet 1

INVENTOR.
HOWARD F. SHEPHERD, JR.
BY C. G. Stratton
ATTORNEY

INVENTOR.
HOWARD F. SHEPHERD, JR.
BY C. G. Stratton
ATTORNEY 3,133,235

VARIABLE IMPEDANCE

Howard F. Shepherd, Jr., 458 S. Spring St., Suite 1124, Los Angeles 13, Calif.

Filed Jan. 11, 1960, Ser. No. 1,612
3 Claims. (Cl. 317—249)

This invention relates to variable impedances for electrical circuits and has for its principal object achievement of a wide range of variations in magnitude of impedance with a high degree of precision in accordance with the setting of the impedance element.

A further object of the invention is to provide a variable impedance construction which may be utilized in forming either reactive or resistive variable impedances.

Another object of the invention is to provide variable impedances useful for either direct-current electrical circuits or alternating-current circuits of high or low frequency, where a wide variation of voltage and/or power rating is desired.

Still another object of the invention is to provide a variable capacitor or variable condenser in which the capacity may be changed from a very small value to a relatively large value and in which predetermined values may accurately be produced by a dial setting.

Other and further objects, features and advantages of the invention will become apparent as the description proceeds.

In carrying out the invention in accordance with a preferred form thereof, flexible strip or sheet material is employed, having two or more layers, one of which is of dielectric or insulating material, and another of which is of electrically conducting material, such as a conductive coating on a dielectric sheet. Means are provided for passing the flexible sheet along the surface of a second element which includes a conductive layer either along the surface or under the surface. In this manner, the area of confronting conductive surfaces may be varied by varying the length of the flexible strip which is passed along the surface of the second element or wrapped upon the latter. If the conductive surfaces are separated by a dielectric material, a variable capacitor is thus produced; on the other hand, if the arrangement is inverted so that the conductive surface of one element is allowed to contact the conductive surface of the other, a variable conductance or resistance is produced, depending upon the resistivity of the conductive surface material. Variations in the nature of the mathematical function of change of impedance with physical movement of the flexible sheet relative to the second element may be accomplished by changing the shape of the portion of the layer which is made conductive or resistive. In the resistor unit, variations may also be made by varying the resistivity of the coating.

A better understanding of the invention will be afforded by the following detailed description, considered in conjunction with the accompanying drawing, in which.

Like reference characters are utilized throughout the drawing to designate like parts.

Figures 1, 2, 3, 4, 5, 6:
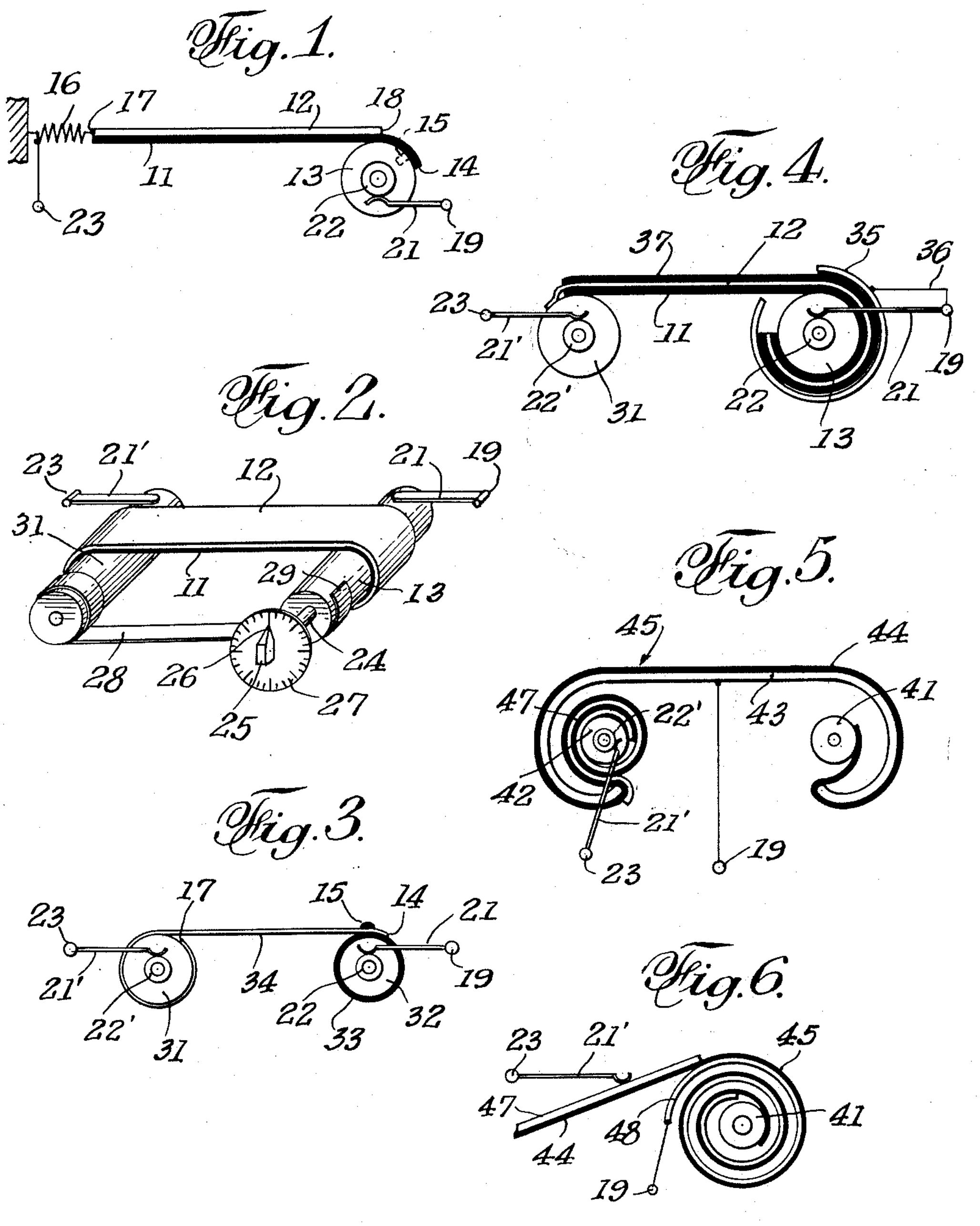
FIG. 1 is a schematic diagram of an embodiment of the invention.
FIG. 2 is a perspective diagram of another embodiment of the invention, in which the flexible sheet material is carried by supply and take-up spools and means are provided for mechanically driving the spools so that the flexible sheet winds onto one spool as fast as it is unwound from the other, and vice versa.
FIG. 3 is a schematic side view of another embodiment of the invention, in which a flexible conductive strip is employed and a dielectric layer is employed upon the surface of a pick-up spool.
FIG. 4 is a diagrammatic end view of a modification of the arrangement of FIGS. 2 and 3, in which increased capacity is achieved by providing an outer shell for the take-up spool.
FIG. 5 is a diagram illustrating an arrangement for enabling more than one turn of flexible sheet material to be wound upon the take-up spool by passing the conductively coated dielectric sheet along a rigid electrode having a surface of greater length than the circumference of the take-up spool, the elecrode being illustrated as having a shape somewhat similar to a conchoid.
FIG. 6 is a diagram illustrating a modification of the multi-turn arrangement of FIG. 5, in which the rigid electrode is spiral in shape.

In the form of variable impedance illustrated in FIG. 1, in accordance with my invention, there is a sheet of thin dielectric or insulating material 11 of low dielectric loss properties, such as polyester film, for example, provided with a conductive coating 12 of silver, copper, aluminum or the like, sprayed onto the film 11. The dielectric sheet 11 is of sufficient length to be wrapped nearly around a cylindrical spool or roller 13 which either is composed of metal or has a conductive metallic surface. One end 14 of the sheet 11 is secured to the spool 13 by rivets, screws, or the like 15, being shown as composed of insulating material.

In order to keep the sheet 11 taut, as it is wrapped around the spool 13 upon clockwise rotation thereof, suitable means such as a restraining spring 16 is provided. For simplicity in the drawing, the restraining spring 16 is shown in the form of a simple tension spring, but it will be understood that the invention does not exclude the use of spiral springs or the like for restraining rotation of a supply spool similar in operation to a shade roller, for example, to which the left-hand end 17 of the conductively coated portion of the strip 11 may be electrically and mechanically secured.

In order that the minimum value of capacity or the maximum value of capacitative impedance may be obtained for one setting of the apparatus of FIG. 1, the dielectric sheet 11 is preferably not conductively coated for its entire length, and the conductive coating 12 terminates at a point 18 which is far enough from the fastened end 14 so that the end of the conductive coating 18 is a sufficient distance from the conductive spool 13 so that when the spool 13 is rotated to the position with the fastening rivet 15 uppermost, a very small capacity appears between the spool 13 and the conductive coating 12. However, when the spool 13 is rotated clockwise so that substantially the entire length of the conductive coating 12 is wrapped around the metallic spool 13 against the restraining force of the spring 16, a relatively large area of conductive material 12 is in very close proximity to the peripheral surface of the conductive spool 13. A very large capacity and a very low capacitative impedance then exist between the conductive coating 12 and the conductive spool 13.

Any suitable means may be employed for making electrical connections to the variable capacity so formed. For example, an electrical connection may be made to the spool 13 from a terminal 19 by means of a brush 21, a slip ring 22, or by a pigtail in electrical contact with the spool or cylinder 13. An electrical connection from a terminal 23 may be made to the conductive coating or layer 12 by means of a pigtail, hairspring, or the like, or other flexible means such as the restraining spring 16 itself, illustrated as being formed of a suitable conductive material such as copper, of sufficient weight for serving to restrain the end 17 and to keep the sheet taut.

It will be understood that suitable means are provided for rotating the take-up spool 13 and indicating the angular setting thereof in order that selected values of capacity may be reproduced precisely. For example, as illustrated in FIG. 2, the take-up spool 13 may be mounted upon a shaft 24 carrying a control knob 25 with a pointer 26 cooperating with a graduated dial 27, which may be calibrated, if desired, in terms of capacity.

It will be understood that the invention is not limited to the use of a spring, such as spring 16, for maintaining the dielectric sheet 11 taut and avoiding fluctuations in capacity for a given angular setting of the take-up spool 13. For example, as illustrated in the arrangement of FIG. 2, a reversely wound tape 28 may be provided, having one end 29 secured to the take-up spool 13 and an opposite end secured to a supply spool 31. The end 17 of the dielectric strip 11 is also secured to the supply spool 31 in the embodiment of FIG. 2, so that as the control knob 25 is rotated in one direction, the tape 28 winds upon one spool and unwinds from the other while the conductively coated dielectric tape 11 unwinds from the first spool as it winds upon the other. Thus, in either direction of rotation, either the tape 28 or the dielectric sheet 11 is in tension to cause the supply spool 31 to rotate.

In the embodiment of FIG. 1, it is the flexible element which is formed with conductive and non-conductive layers, the rigid element or the spool 13 being conductive on its surface. The invention is not limited to this arrangement, however, but includes an arrangement in which the rigid member has conductive and non-conductive layers, as illustrated in FIG. 3, for example. A take-up spool 32 is provided, having a conductive surface covered with a non-conductive insulating or dielectric layer 33, and the flexible element is in the form of a metallic or foil strip 34 secured at one end to the spool 32 by insulating fasteners 15 and secured by suitable means at the opposite end 17 to a supply spool 31, which in this arrangement is shown as being conductive in order that connection to the terminal 23 may be made through a brush 21′ and a slip ring 22′.

The electrical capacity of the arrangements of FIGS. 1 and 2 may be approximately doubled, if desired, by providing a conductive shell or electrode 35, as shown in FIG. 4, surrounding the conductive take-up spool 13. In this case, the conductive shell 35 is also connected to the terminal 19 by, for example, means of a conductor 36. In order to obtain the maximum increase in capacity, the inner surface of the conductive shell 35 is brought as close to the conductive coating 12 on the dielectric sheet 11 as possible. If clearance is maintained, no insulation on the inner surface of the shell 35 or on the outer surface of the conductive coating 12 may be required. However, for apparatus to be used with high voltages, in order to guard against arcing or corona effects, or where greater capacitance is desired, preferably a dielectric coating is provided on one of these surfaces. For example, as shown, a second dielectric layer 37 corresponding to the dielectric sheet 11 is employed with the conductive coating or film 12 interposed between the dielectric layers 11 and 37. It will be understood that in the drawing the relative thicknesses of the dielectric or insulating sheets and the conductive films or coatings, and the clearance under the shell 35, have been greatly exaggerated for clarity in the illustration.

Still greater variations between the minimum and maximum values of capacity for different relative positions of the flexible and rigid conductive members or condenser plate elements, may be accomplished by an arrangement in which the length of the conductive layer on the dielectric sheet is greater than the circumference of the take-up spool. For example, as illustrated in FIGS. 5 and 6, rigid stationary electrodes are provided separate from the take-up spool, and the surface length of the rigid stationary electrode is greater than the periphery of the take-up spool. As illustrated in FIG. 5, a take-up spool 41 is provided having no electrical connection with the terminal 19 and which serves merely for winding up conductively coated dielectric sheet material drawn from a supply spool 42 carrying a plurality of turns of such sheet material. A rigid stationary electrode or condenser plate 43 is provided which is preferably curved; for example, in a form similar to a cycloid or to a conchoid, so that the dielectric tape material passes along the surface of the electrode 43 as it is drawn from the supply spool 42 to the take-up spool 41.

As shown, a dielectric sheet 44 is employed of considerably greater length than the circumference of the take-up spool 41, and a sufficient length 45 of the dielectric sheet 44 remains uncoated, so that when the take-up spool 41 is unwound, the end 46 of the conductive coating is spaced from the surface of the stationary rigid electrode 43; and the conductive coating 47 passes along the surface of the rigid electrode 43 as the dielectric sheet is wound up on the take-up spool 41. In this case, the terminal 19 is connected to the electrode 43 and the terminal 23 is connected in any suitable manner to the conductive coating. The electrical capacity of the arrangement of FIG. 5 may, if desired, be increased by employing an outer shell or electrode conforming in shape to the electrode 43 similar to the arrangement of FIG. 4.

Figure 7:
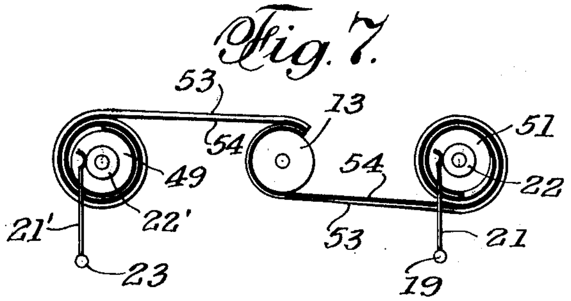
FIG. 7 is a diagram of a multi-turn arrangement, in which separate supply spools are employed for the dielectric and conductive sheet material.

Another form of multi-turn variable condenser is illustrated in FIG. 6, wherein a spirally shaped, rigid, stationary electrode 48 is provided. In this case, the capacity effect is increased because the conductive coating 47 passes between convolutions of the spiral 48. For high voltage apparatus, or where greater capacitance is required, as in FIG. 4, either the outer surface of the conductive coating 47 or the inner surface of the spiral electrode 48 may be covered with a dielectric layer.

Where extremely high variable capacitance is desired, the same may be provided by the arrangement of FIG. 7, in which a single take-up spool 13 is employed in conjunction with a pair of supply spools 49 and 51, each arranged to hold a plurality of layers of conductive strip material 53 and dielectric sheet material 54. The tapes from spools 49 and 51 are wound upon the pick-up spool 13, as it is rotated clockwise, increasing the capacity between the terminals 19 and 23.

The electrical connection from the terminal 23 and the brush 21′ through the slip ring 22′ passes directly along the layers of conductive strip material 53 wound on the conductive supply spool 49, introducing a minimum electrical resistance even though the conductive strip 53 may be very thin. On the other hand, where it is desired to provide a variable resistive impedance instead of capacitative reactance, the relationship between the conductive and dielectric layers of sheet material may be reversed, as illustrated in FIG. 8, where the conductive layer 12 contacts the spool 13.

Figure 8:
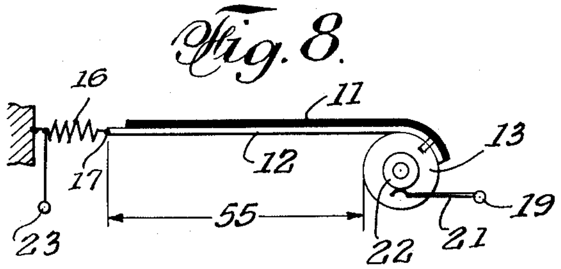
FIG. 8 is a diagram corresponding to FIG. 1, illustrating the manner in which the same general construction may be converted from a variable capacitor to a variable resistor by interchanging the dielectric layer and the conductive or resistive coating thereon of the flexible sheet material.
Figure 9:
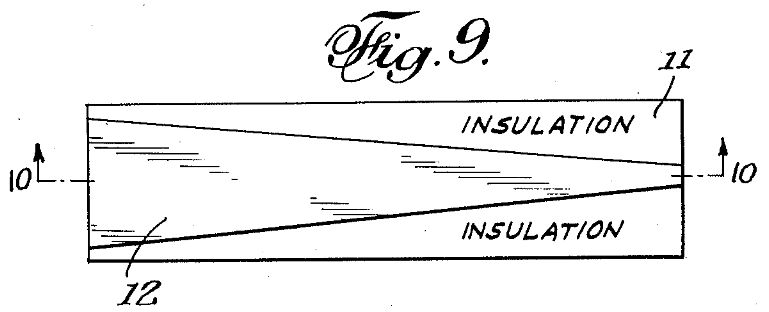
FIG. 9 is a diagram illustrating the manner of varying the functional relationship between impedance and movement of the flexible sheet material by changing the shape of the conductive coating on the dielectric or insulating sheet.

As illustrated in the arrangement of FIG. 8, with the flexible sheath overturned as compared with the arrangement of FIG. 1, so that coating 12 is permitted to make contact electrically with the conductive-surface spool 13, the electrical resistance between the terminals 19 and 23 depends on the angular position of the spool 13, which determines the length 55 of contacting material between the end 17 and the conductive-surface spool 13. It will be understood that when relatively high resistance is desired, the coating 12 is made very thin or is composed of relatively high-resistivity material, such as nickel-chromium alloys, deposited carbon, or similar film, for example.

Figure 10:
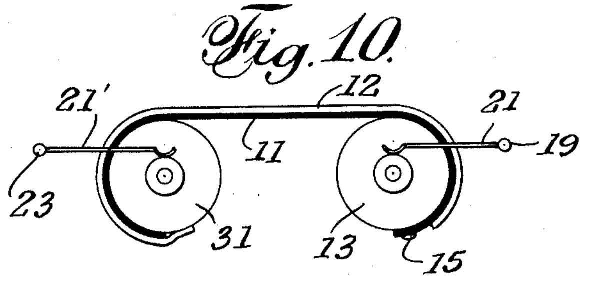
FIG. 10 is a cross-sectional view of a construction such as may be employed in the embodiments of FIGS. 2 and 9.

It will be apparent that the capacity, admittance or conductance of the unit will vary substantially linearly with rotation of the take-up spool 13 and the impedance will be an inverse function. Different mathematical functions may be expressed in the relationship between the angular position of the take-up spool 13 and the electrical dimensions of the unit; however, if desired, this may be accomplished, for example, by varying the width of the conductive coating 11 upon the dielectric strip 12, as illustrated in FIG. 10, or also varying resistivity of coating 11 in the case of variable resistor units.

Although I have described and illustrated arrangements in which the flexible strip is of considerable width in relation to the axial length of the spool on which it is wound, it will be understood that the invention is not limited thereto and does not exclude an arrangement in which successive turns of relatively narrow conductive-surface strip or wire are wound beside each other in the same layer upon a spool, being insulated from the metal of the spool in the case of a variable condenser, but not necessarily from each other in any one layer, so as to obtain an additional micrometer effect from fractional turns.

While the foregoing specification illustrates and describes what I now contemplate to be the best modes of carrying out my invention, the constructions are, of course, subject to modification without departing from the spirit and scope of my invention. Therefore, I do not desire to restrict the invention to the particular forms of construction illustrated and described, but desire to cover all modifications that may fall within the scope of the appended claims.

Having thus described my invention, what I claim and desire to secure by Letters Patent is:

1. A variable impedance comprising: a supply spool; a take-up spool; a flexible elongate conductor having one of its ends mechanically fixed to said supply spool and the other of its ends mechanically fixed to said take-up spool, said conductor being wound around said supply spool in a first predetermined direction and around said take-up spool in a second predetermined direction; and a return tape having one of its ends mechanically fixed to said supply spool and the other of its ends mechanically fixed to said take-up spool, said return tape being wound around said supply spool in a direction opposite said first predetermined direction and around said take-up spool in a direction opposite said second predetermined direction, whereby rotation of only one of said spools in either direction will cause rotation of the other of said spools.

2. The invention as defined in claim 1, wherein said first and second predetermined directions are opposite.

3. A variable capacitor comprising: a supply spool; a conductive take-up spool, said spools being insulated from each other; a flexible elongate conductor having one of its ends mechanically fixed to said supply spool and the other of its ends mechanically fixed to, but electrically insulated from said take-up spool, said conductor being wound around said supply spool in a first predetermined direction and around said take-up spool in a second predetermined direction; and a return tape having one of its ends mechanically fixed to said supply spool and the other of its ends mechanically fixed to said take-up spool, said return tape being wound around said supply spool in a direction opposite said first predetermined direction and around said take-up spool in a direction opposite said second predetermined direction, whereby rotation of only one of said spools in either direction will cause rotation of the other of said spools.

References Cited in the file of this patent

UNITED STATES PATENTS

| | | |
|---|---|---|
| 1,033,095 | Gernsback | July 23, 1912 |
| 1,606,008 | Wiegand | Nov. 9, 1926 |
| 1,652,158 | Aull | Dec. 13, 1927 |
| 1,740,850 | Zarate | Dec. 24, 1929 |
| 2,988,638 | Knausenberger | June 13, 1961 |
| 2,993,182 | Ellis | July 18, 1961 |
| 3,001,161 | Broadhead et al. | Sept. 19, 1961 |

FOREIGN PATENTS

| | | |
|---|---|---|
| 153,858 | Great Britain | Nov. 18, 1920 |